United States Patent
Wang et al.

(10) Patent No.: US 12,025,739 B1
(45) Date of Patent: Jul. 2, 2024

(54) FREQUENCY MODULATED CONTINUOUS WAVE LiDAR AND AUTONOMOUS DRIVING DEVICE

(71) Applicant: SUTENG INNOVATION TECHNOLOGY CO., LTD., Shenzhen (CN)

(72) Inventors: Jing Wang, Shenzhen (CN); Chunxin Qiu, Shenzhen (CN); Letian Liu, Shenzhen (CN)

(73) Assignee: SUTENG INNOVATION TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/518,411

(22) Filed: Nov. 22, 2023

(30) Foreign Application Priority Data

Dec. 14, 2022 (CN) .......................... 202211600478.9

(51) Int. Cl.
*G01S 7/481* (2006.01)
*G01S 17/931* (2020.01)

(52) U.S. Cl.
CPC .......... *G01S 7/4813* (2013.01); *G01S 7/4817* (2013.01); *G01S 17/931* (2020.01)

(58) Field of Classification Search
CPC .... G01S 7/4811; G01S 7/4813; G01S 7/4815; G01S 7/4817; G01S 7/491; G01S 17/003;
(Continued)

(56) References Cited

U.S. PATENT DOCUMENTS

2011/0006943 A1* 1/2011 Shaffer ................. G01S 17/933
    342/146
2022/0196814 A1* 6/2022 Lin ........................ G01S 17/931
(Continued)

FOREIGN PATENT DOCUMENTS

CN      104820223 A    8/2015
CN      106932785 A    7/2017
(Continued)

OTHER PUBLICATIONS

First Office Action issued in related Chinese Application No. 202211600478.9, mailed Feb. 10, 2023, 14 pages.

*Primary Examiner* — Yuqing Xiao
*Assistant Examiner* — Benjamin Richard Hebert
(74) *Attorney, Agent, or Firm* — BAYES PLLC

(57) ABSTRACT

This application discloses a frequency modulated continuous wave LiDAR and an autonomous driving device. The LiDAR includes a light source module, a silicon photonic chip and a refraction module, and the silicon photonic chip includes a light splitting module, a coupling module and multiple transceiving units. The light splitting module receives a laser beam coupled into the silicon photonic chip, divides the laser beam into multiple beams of detection light, and transmits the multiple beams of detection light to corresponding multiple transceiving units, and the transceiving units emit the received detection light outward. The refraction module is configured to refract the detection light emitted by the multiple transceiving units to emit multiple beams of detection light in a staggered manner in a second direction, where the second direction is a direction perpendicular to the terminal surface of the transceiving unit.

11 Claims, 8 Drawing Sheets

(58) Field of Classification Search
CPC ........ G01S 17/32; G01S 17/34; G01S 17/931; G02B 5/04; G02B 26/0875; G02B 27/0972; G02B 27/0977
See application file for complete search history.

(56) References Cited

U.S. PATENT DOCUMENTS

| | | | | |
|---|---|---|---|---|
| 2022/0334232 A1* | 10/2022 | Behzadi | ............... | G01S 17/931 |
| 2022/0365190 A1* | 11/2022 | Nathan | ............... | G01S 7/4817 |
| 2022/0404473 A1* | 12/2022 | Shi | ............... | G01S 7/4815 |
| 2022/0413102 A1* | 12/2022 | Li | ............... | G02B 26/121 |
| 2023/0366986 A1* | 11/2023 | Islam | ............... | G01S 7/4818 |

FOREIGN PATENT DOCUMENTS

| | | | | |
|---|---|---|---|---|
| CN | 109765542 A | | 5/2019 | |
| CN | 110336183 A | * | 10/2019 | |
| CN | 111381239 A | | 7/2020 | |
| CN | 112965045 A | | 6/2021 | |
| CN | 113075681 A | * | 7/2021 | |
| CN | 114325639 A | | 4/2022 | |
| CN | 114779269 A | | 7/2022 | |
| CN | 114779277 A | | 7/2022 | |
| CN | 114791611 A | | 7/2022 | |
| CN | 115128579 A | | 9/2022 | |
| CN | 115128734 A | | 9/2022 | |
| CN | 115210603 A | | 10/2022 | |
| CN | 115291194 A | | 11/2022 | |
| WO | WO-2020098771 A1 | * | 5/2020 | ............ G01S 7/4811 |
| WO | 2021196194 A1 | | 10/2021 | |
| WO | 2021218362 A1 | | 11/2021 | |
| WO | 2022213658 A1 | | 10/2022 | |

* cited by examiner

FREQUENCY MODULATED CONTINUOUS WAVE LiDAR AND AUTONOMOUS DRIVING DEVICE

CROSS-REFERENCE TO RELATED APPLICATION

The present application claims the benefit of priority to Chinese Patent Application No. 202211600478.9, filed on Dec. 14, 2022, which is hereby incorporated by reference in its entirety.

TECHNICAL FIELD

This application relates to the technical field of LiDAR, and in particular, to a frequency modulated continuous wave LiDAR and an autonomous driving device.

TECHNICAL BACKGROUND

A LIDAR is one of core sensors widely used in autonomous driving scenarios and can be used to collect three-dimensional information about an external environment. The LiDAR can be mainly divided into two types of LiDAR of Time of Flight (ToF) and Frequency Modulated Continuous Wave (FMCW) as per detection mechanisms. The FMCW LiDAR uses a coherent detection method and performs a balanced detection method at a receiving end by using local oscillator light and signal light reflected by a target object, which can effectively reduce interference of external ambient light on performance of the LiDAR, thereby improving ranging performance of the LiDAR. In addition to spatial coordinate information, the FMCW LiDAR can also provide speed measurement information.

In a related art, the FMCW LiDAR cannot adjust a position of an optical path in two directions, making it difficult to improve a detection field of view and resolution of the LiDAR.

SUMMARY

Embodiments of this application provide a frequency modulated continuous wave LiDAR and an autonomous driving device, which can resolve a poor detection performance problem of the FMCW LiDAR.

According to a first aspect, an embodiment of this application provides a frequency modulated continuous wave LiDAR, including:
 a light source module, configured to emit a frequency modulated continuous wave laser beam;
 a silicon photonic chip, including a light splitting module, a receiving module and multiple transceiving units, where terminal surfaces of the multiple transceiving units are arranged along a first direction, the light splitting module receives a laser beam coupled into the silicon photonic chip, divides the laser beam into multiple beams of detection light, and transmits the multiple beams of detection light to corresponding multiple transceiving units, and the transceiving units emit the received detection light outward, and also transmit received echo light to the receiving module to form a detection channel; and
 a refraction module, configured to refract the detection light emitted by the multiple transceiving units to emit multiple beams of detection light in a staggered manner in a second direction, and configured to refract multiple beams of echo light staggered in the second direction and then emit the multiple beams of echo light to the corresponding transceiving units, where the second direction is a direction perpendicular to the terminal surface of the transceiving unit.

In some exemplary embodiments, the refraction module includes at least one of a first reflection element and a first refraction prism, the number of first reflection elements is at least one, and the number of first refraction prisms is at least one.

In some exemplary embodiments, the refraction module includes multiple first reflection elements disposed corresponding to the multiple transceiving units; and
 each first reflection element is configured to reflect optical paths of the detection light emitted by the corresponding transceiving unit and the received echo light, the first reflection element and the terminal surface of the corresponding transceiving unit are disposed at intervals in the second direction, and the multiple first reflection elements are staggered in the second direction.

In some exemplary embodiments, the refraction module includes multiple first refraction prisms;
 the multiple beams of detection light emitted by the multiple transceiving units are emitted to the corresponding multiple first refraction prisms, and are refracted by the multiple first refraction prisms and emitted outward in a staggered manner in a second direction; and
 after the multiple beams of echo light staggered in the second direction are refracted by the corresponding first refraction prism, each beam of echo light returns to the corresponding transceiving unit through a corresponding detection channel.

In some exemplary embodiments, the frequency modulated continuous wave LiDAR further includes multiple collimating lens groups that are correspondingly disposed on a front side of the terminal surfaces of the multiple transceiving units and that are configured to collimate the detection light emitted by the transceiving unit and also configured to focus the echo light emitted to the transceiving unit.

In some exemplary embodiments, each transceiving unit includes an emission module and a coupling module, the emission module emits the received detection light outward from an emission terminal surface, the coupling module receives the echo light via a receiving terminal surface and transmits the echo light to the coupling module, and the emission terminal surface of the emission module and the receiving terminal surface of the coupling module form the terminal surface of the transceiving unit.

In some exemplary embodiments, the frequency modulated continuous wave LiDAR further includes multiple first amplification modules, disposed corresponding to the emission module and configured to amplify the detection light emitted by the corresponding emission module.

In some exemplary embodiments, the refraction module further includes:
 a dimming lens group, configured to perform beam expansion on the detection light refracted by the refraction module and then emit the detection light outward and also configured to perform beam reduction on the echo light and then emit the echo light to the refraction module.

In some exemplary embodiments, the multiple transceiving units emit the detection light or receive the echo light through the same dimming lens group.

In some exemplary embodiments, the frequency modulated continuous wave LiDAR further includes:

a first packaging housing, where the light source module and the silicon photonic chip are packaged in internal space of the first packaging housing; and a second packaging housing, where the refraction module is packaged in internal space of the second packaging housing, where the second packaging housing is docked with the first packaging housing, the first packaging housing is provided with multiple first optical through holes, the second packaging housing is provided with multiple second optical through holes, and the first optical through hole and the second optical through hole are disposed correspondingly to allow the detection light and the echo light to pass through.

According to a second aspect, an embodiment of this application provides an autonomous driving device, including an autonomous driving body and the foregoing frequency modulated continuous wave LiDAR, where the frequency modulated continuous wave LiDAR is mounted on the autonomous driving body by using a horizontal direction as a first direction and a vertical direction as a second direction.

Based on the frequency modulated continuous wave LiDAR and the autonomous driving device in the embodiments of this application, the multiple groups of transceiving units are integrated into the silicon photonic chip and are configured to detect the target object; in addition, each group of transceiving units are provided with corresponding refraction modules; the refraction module is configured to change propagation and arrangement directions of optical paths of the multiple channels; and even if multiple groups of transceiving units are designed to be parallel to a surface of the silicon photonic chip, the optical paths of the multiple channels are extending in a direction perpendicular to the terminal surface of the transceiving unit, it can be achieved that the optical paths of the multiple channels are staggered in the direction perpendicular to the terminal surface of the transceiving unit, which increase channels of the frequency modulated continuous wave LiDAR in the direction, thereby increasing detection resolution and enlarging an angle of view. The silicon photonic chip has a simple design and high integration, and is easy to tape out. In addition, in this application, multiple groups of transceiving units are integrated into the silicon photonic chip without a need to dispose a discrete emission module separately, which achieves high integration and can also effectively reduce assembling and dimming complexity of a photoelectric device inside the frequency modulated continuous wave LiDAR.

BRIEF DESCRIPTION OF DRAWINGS

To describe the technical solutions in the embodiments of this application or in the related art more clearly, the following briefly describes the accompanying drawings required for describing the embodiments or the related art. Apparently, the accompanying drawings in the following description show merely some embodiments of this application, and a person skilled in the art may still derive other drawings from these accompanying drawings without creative efforts.

REFERENCE SIGNS

10—Frequency modulated continuous wave LiDAR;
200—Light source module; 210—First light guide mirror; 220—Isolator; 230—Second light guide mirror; 240—Frequency modulated light source;
300—Silicon photonic chip;
320—Light splitting module; 321—First light splitter; 322—Second light splitter; 323—Third light splitter; 324—Mode spot converter;
330—Transceiving unit; 331—Emission module; 3311—Emission waveguide; 331a—Emission field of view; 331b—Emission terminal surface; 332—Coupling module; 3321—Receiving waveguide; 332a—Receiving field of view; 332b—Receiving terminal surface; 330a—Scanning blind region;
350—Receiving module; 351—Polarization splitter-rotator; 360—Optical frequency mixer; 370—First balance detector; 340—Light source nonlinear calibration optical path; 341—Coupler; 342—Calibration balance detector; 343—Optical delay line;
400—Refraction module; 411—First reflection element; 412—First refraction prism; 413—Second reflection element;
420—Beam scanning module; 421—One-dimensional galvanometer; 4211—Galvanometer; 422—One-dimensional rotating mirror; 4221—Rotating mirror; 430—First amplification module; 440—Collimating lens group; 450—Dimming lens group;
510—First packaging housing; 520—Second packaging housing;
600—Temperature control module; 700—Signal processing circuit;
810—Multi-port coupler; 820—Straight-through waveguide; 811—First access port; 812—First output port; 821—Second access port; 822—Second output port; and
Y—First direction; X—Second direction.

DETAILED DESCRIPTION

To make objectives, technical solutions and advantages of this application more comprehensible, the following further describes this application in detail with reference to accompanying drawings and embodiments. It should be understood that the specific embodiments described herein are merely used to explain this application but are not intended to limit this application.

The inventor has found that FMCW LiDAR has a walk-off effect due to movement of a scanning apparatus, which significantly affects receiving efficiency. To reduce the negative impact of the walk-off effect on performance of the LiDAR, a scanning speed of the scanning apparatus of the LiDAR cannot be greatly increased, and therefore, an increase in the number of equivalent lines of the LiDAR is limited, which directly affects resolution and an angle of view of the LiDAR.

To resolve the foregoing problem, embodiments of this application provide frequency modulated continuous wave LiDAR and an autonomous driving device.

Figure 1:
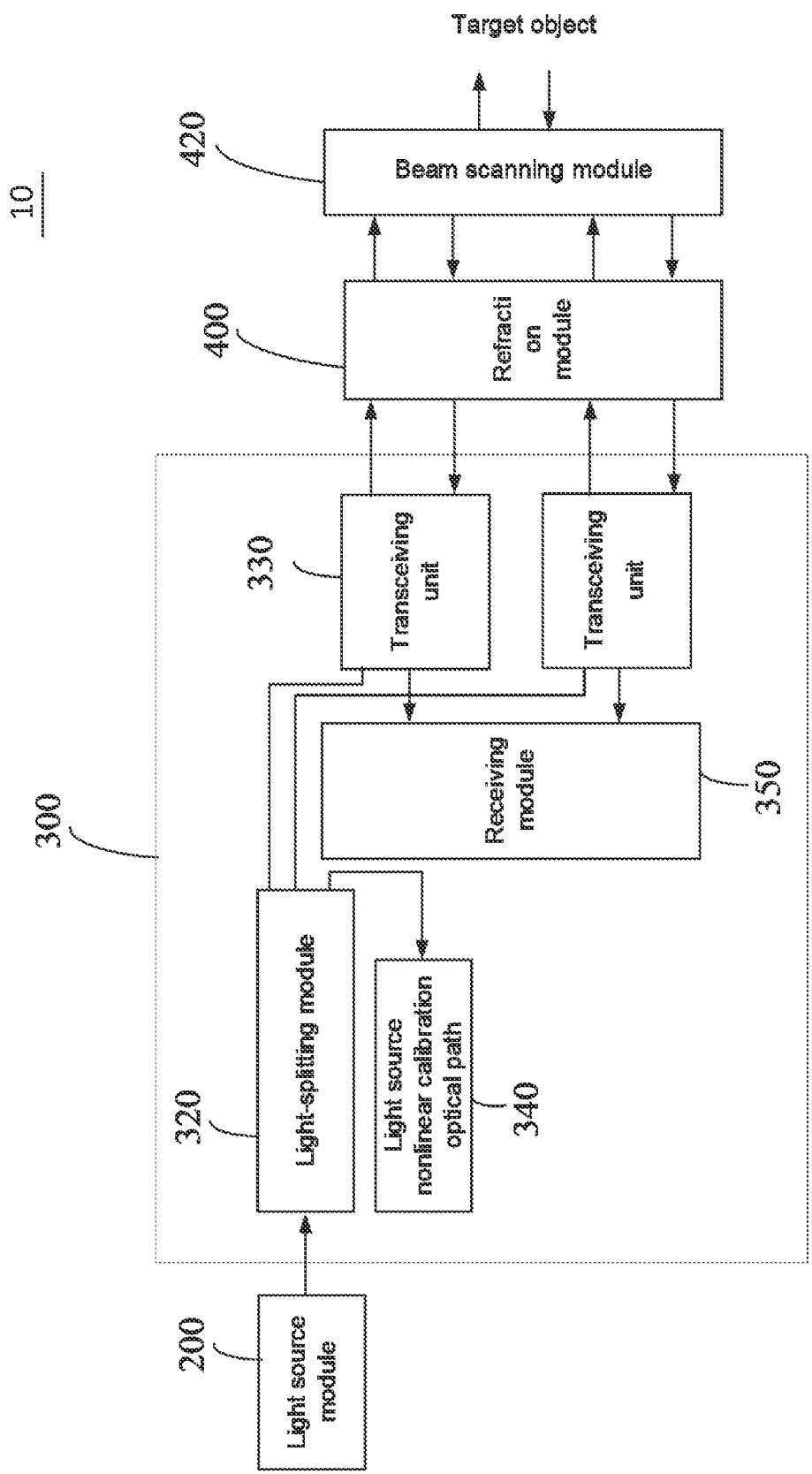
FIG. 1 is a schematic diagram of a systematic architecture of frequency modulated continuous wave LiDAR according to an embodiment of this application.

As shown in FIG. 1, FIG. 1 is a diagram of a systematic architecture of frequency modulated continuous wave LiDAR 10 according to an embodiment of this application. The frequency modulated continuous wave LiDAR 10 includes a light source module 200, a silicon photonic chip 300, and a refraction module 400. The light source module 200 is configured to emit a laser beam. The silicon photonic chip 300 is disposed on a light outgoing side of the light source module 200. The laser beam emitted by the light source module 200 passes through the silicon photonic chip 300, the refraction module 400, and the beam scanning module 420 and then is emitted to the target object. Echo light returned after reflection by the target object passes through the beam scanning module 420 and the refraction module 400 and then enters the silicon photonic chip 300.

Figure 2:
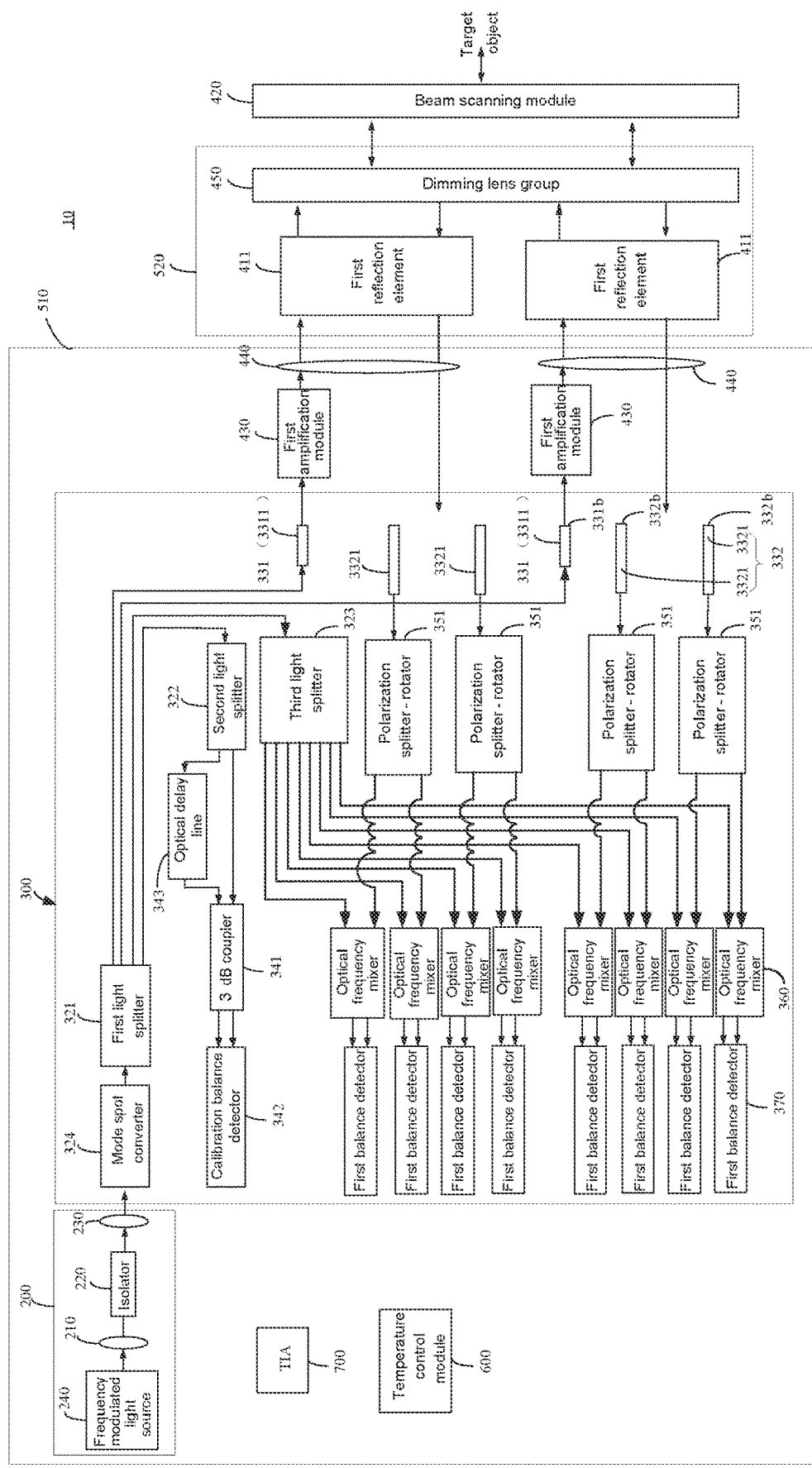
FIG. 2 is a schematic diagram of a systematic architecture of two groups of transceiving units corresponding to a refraction module according to an embodiment of this application.

As shown in FIG. 2, the light source module 200 includes a frequency modulated light source 240, a first light guide mirror 210, an isolator 220 and a second light guide mirror 230. The frequency modulated light source 240 can be a frequency modulated laser, configured to emit a frequency modulated continuous wave laser beam. The first light guide mirror 210 and the second light guide mirror 230 are both disposed on the light outgoing side of the frequency modulated light source 240. The isolator 220 is disposed between the first light guide mirror 210 and the second light guide mirror 230, and the laser beam emitted by the frequency modulated light source 240 passes through the first light guide mirror 210, the isolator 220 and the second light guide mirror 230 in sequence. The first light guide mirror 210 is configured to collimate the laser beam and then emit the laser beam to the second light guide mirror 230. The isolator 220 is configured to prevent light on a side of the second light guide mirror 230 from being transmitted reversely to a side of the isolator 220 facing toward the first light guide mirror 210, thereby preventing the laser beam from interfering with normal working of the frequency modulated light source 240. The second light guide mirror 230 receives the collimated laser beam transmitted by the isolator 220, focuses the collimated laser beam, and then couples the collimated laser beam into the silicon photonic chip 300. In some embodiments, the silicon photonic chip 300 includes a light splitting module 320, and the laser beam coupled into the silicon photonic chip 300 is transmitted to the light splitting module 320.

The silicon photonic chip 300 also includes multiple groups of transceiving units 330. Terminal surfaces of the multiple transceiving units 330 are arranged along the first direction Y. Light enters and exits the transceiving units 330 via the terminal surfaces of the transceiving units 330, and the terminal surfaces of the transceiving units 330 are parallel to the first direction Y. The light splitting module 320 receives a laser beam coupled into the silicon photonic chip 300, divides the laser beam into multiple beams of detection light, and transmits the multiple beams of detection light to corresponding multiple transceiving units 330 separately, and the transceiving units 330 emit the received detection light outward, and also transmit received echo light to the coupling module 332 to form a detection channel.

The refraction module 400 is configured to refract the detection light emitted by the multiple transceiving units 330 to emit multiple beams of detection light in a staggered manner in a second direction X, and configured to refract multiple beams of echo light staggered in the second direction X and then emit the multiple beams of echo light to the corresponding transceiving units 330, where the second direction X is a direction perpendicular to the terminal surface of the transceiving unit 330. Even if multiple groups of transceiving units 330 are designed to be parallel to a surface of the silicon photonic chip 300, the optical paths of the multiple channels are extending in a direction perpendicular to the terminal surface of the transceiving unit, by changing the direction of the propagation and arrangement of the multi-channel optical path through the refraction module 400, it can be achieved that the optical paths of the multiple channels are staggered in the direction perpendicular to the terminal surface of the transceiving unit 330, which increase channels of the frequency modulated continuous wave LiDAR 10 in the direction, thereby increasing detection resolution and an angle of view of the frequency modulated continuous wave LiDAR 10. The silicon photonic chip 300 has a simple design and high integration, and is easy to tape out. In addition, in this application, multiple groups of transceiving units 330 are integrated into the silicon photonic chip 300 without a need to dispose a discrete emission module separately to emit detection light outward, which achieves high integration and can also effectively reduce assembling and dimming complexity of a photoelectric device inside the frequency modulated continuous wave LiDAR 10.

Figure 3:
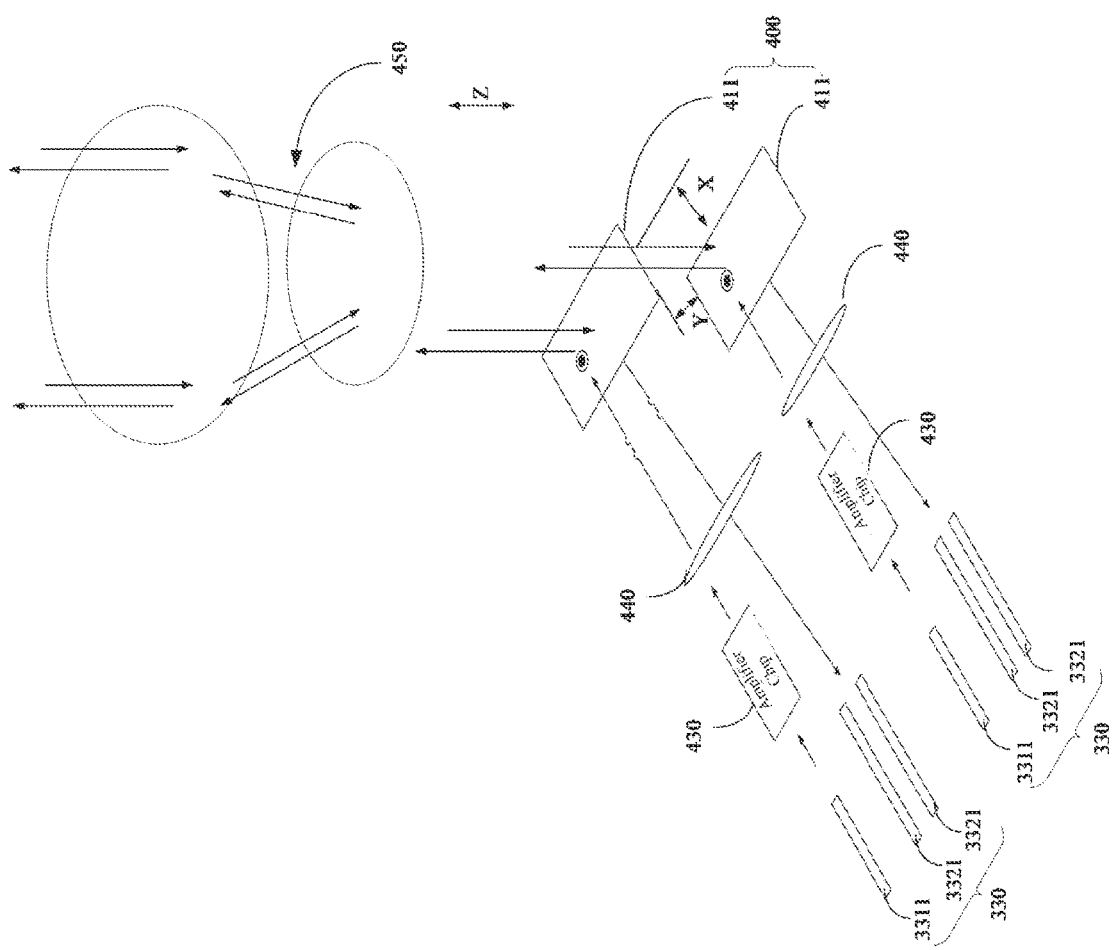
FIG. 3 is a schematic structural diagram of a refraction module including two first reflection elements according to an embodiment of this application.

As shown in FIG. 3, the detection light emitted by each transceiving unit 330 is emitted to the refraction module 400 along the second direction X. The refraction module 400 is configured to change a propagation direction of the detection light emitted by multiple transceiving units 330, so that multiple beams of detection light are staggered in the second direction X and then emitted. In addition, the multiple beams of echo light reflected by the target object return along an optical path approximately overlapping with that of the detection light and are emitted to the refraction module 400, so that the emitted detection light and the received echo light of each transceiving unit 330 are propagated in their corresponding detection channels, to satisfy a multi-channel detection need.

Figure 5:
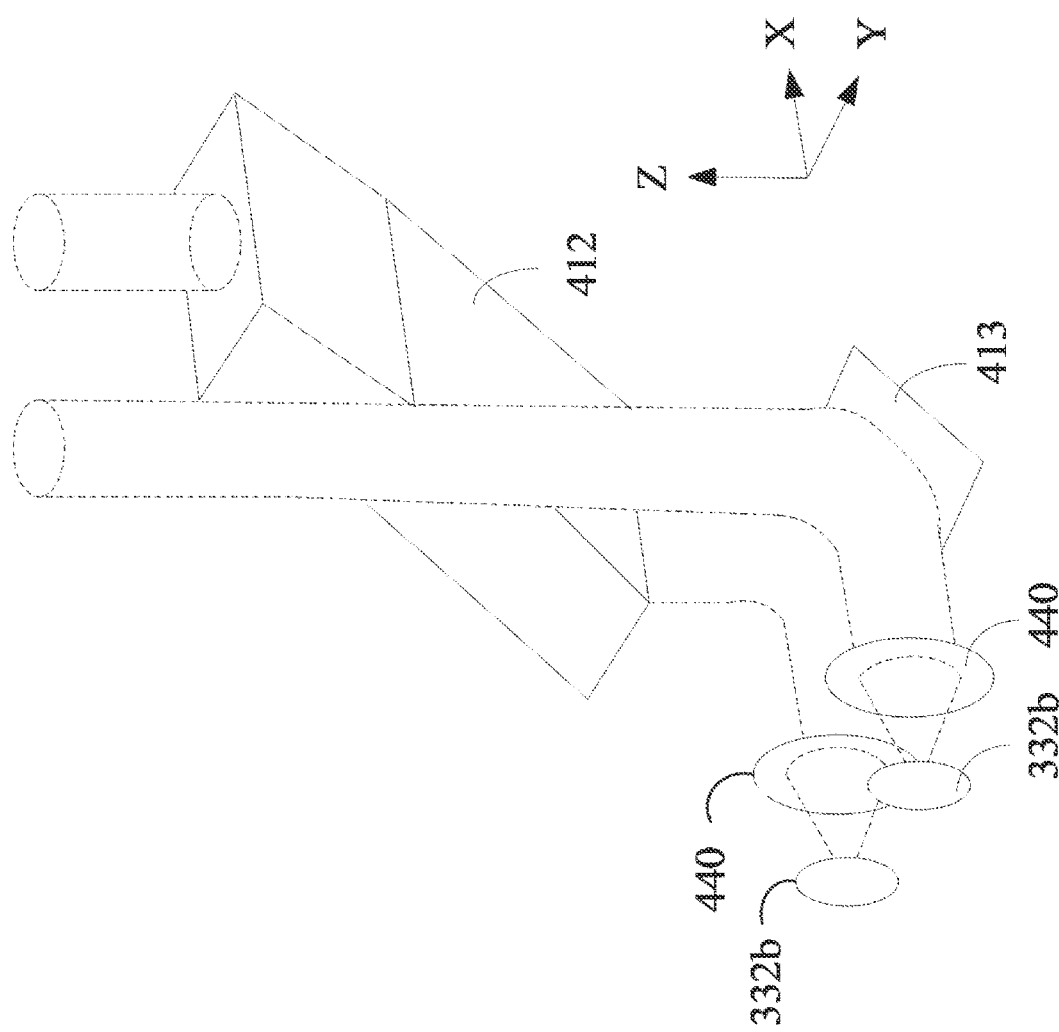
FIG. 5 is a schematic structural diagram of a refraction module including a first reflection element and a first refraction prism according to an embodiment of this application.

As shown in FIG. 3 and FIG. 5, the refraction module 400 includes at least one of a first reflection element 411 and a first refraction prism 412. The first reflection element 411 is configured to reflect detection light or echo light, and the first refraction prism 412 is configured to refract the detection light or the echo light, and can correspondingly change the propagation direction of the detection light or the echo light. The number of first reflection elements 411 is at least one, and the number of first refraction prisms 412 is at least one.

In some embodiments, as shown in FIG. 3, the refraction module 400 includes multiple first reflection elements 411 arranged corresponding to the multiple transceiving units 330, and the number of multiple transceiving units 330 is the same as the number of multiple first reflection elements 411. Each first reflection element 411 is configured to reflect optical paths of the detection light emitted by the corresponding transceiving unit 330 and the received echo light. The first reflection element 411 and the terminal surface of the corresponding transceiving unit 330 are disposed at intervals in the second direction X, and the multiple first reflection elements 411 are staggered in the second direction X. That is, when the terminal surfaces of the multiple transceiving units 330 are flush, distances between the multiple first reflection elements 411 and the terminal surfaces of the corresponding transceiving units 330 in the second direction X are different. When the echo light reaches the transceiving unit 330 after being reflected by the first reflection element 411, with a special design of staggering the multiple first reflection elements 411 in the second direction X, multiple beams of echo light can be exactly received correspondingly, and the corresponding echo light is reflected to propagate along the second direction X and emitted to the corresponding transceiving unit 330. In this way, the frequency modulated continuous wave LiDAR 10 has multiple detection channels in the second direction X, thereby increasing detection resolution and the angle of view of the frequency modulated continuous wave LiDAR 10.

By taking the vertical direction as the second direction X and the horizontal direction as the first direction Y, when the frequency modulated continuous wave LiDAR 10 is mounted on an autonomous driving body of the autonomous driving device, the multiple first reflection elements 411 staggered in the vertical direction can exactly correspondingly emit, outward in a staggered manner in the vertical direction, the detection light emitted by the silicon photonic chip 300, receive multiple beams of echo light staggered in the vertical direction, and reflect the multiple beams of echo light to the corresponding transceiving unit 330 to form multiple detection channels in the vertical direction, thereby increasing the number of equivalent lines in the vertical direction, so that the frequency modulated continuous wave LiDAR 10 can still have better resolution and a larger angle of view even when mounted on the autonomous driving body.

In some embodiments, the refraction module 400 includes multiple first refraction prisms 412. The multiple beams of detection light emitted from the terminal surfaces of the multiple transceiving units 330 arranged along the first direction Y are emitted to the corresponding first refraction prisms 412, and are emitted outward in a staggered manner in the second direction X after being refracted by the first refraction prisms 412; and after the multiple beams of echo light staggered in the second direction X are refracted by the corresponding first refraction prisms 412, each of the multiple beams of echo light returns to the corresponding transceiving unit 330 along an optical path of the same detection channel. For example, when the silicon photonic chip 300 includes two transceiving units 330, the refraction module 400 is set to include a first refraction prism 412. The first refraction prism 412 is disposed corresponding to one of the transceiving units 330. The detection light emitted by another of the transceiving units 330 or the returned echo light propagates directly, and the first refraction prism 412 refracts the detection light emitted by the corresponding transceiving unit 330 or the returned echo light to adjust an optical path position for transmitting and receiving light by the transceiving unit 330, so that the two detection channels of the two transceiving units 330 are staggered in the second direction X switched from the first direction Y. Certainly, the two transceiving units 330 may also be provided with first refraction prisms 412 correspondingly for adjusting a mutual arrangement relationship between the optical paths of the two channels.

The refraction module 400 changes the propagation direction of the detection light, so that the optical paths of the multiple channels are staggered in the second direction X. Further, the refraction module 400 may also include a second reflection element 413. The second reflection element 413 is configured to adjust a direction of the optical path. To save space inside the LiDAR, it is possible that a position of the silicon photonic chip 300 cannot ensure that the optical paths of the multiple channels are arranged along the first direction Y and emitted toward the corresponding first refraction prism 412, and as a result, a placement angle of the silicon photonic chip 300 affects directions of incident and outgoing optical paths from the terminal surface of the transceiving unit. To adjust the direction of the optical path, the second reflection element 413 is provided. The number of disposed second reflection elements 413 may be multiple. For example, as shown in FIG. 5, the refraction module 400 includes a second reflection element 413 and a first refraction prism 412. The detection light emitted by one transceiving unit 330 is directly reflected by the second reflection element 413 to form first outgoing light to be directly emitted outward. After being reflected by the second reflection element 413, the detection light emitted by another transceiving unit 330 enters the first refraction prism 412 and is refracted by the first refraction prism 412 to form second outgoing light to be emitted outward. At this time, the two beams of outgoing light staggered in the second direction become the first outgoing light and the second outgoing light that are spaced in the second direction X, and arrangement directions of the optical paths of the multiple channels are changed.

Figure 4:
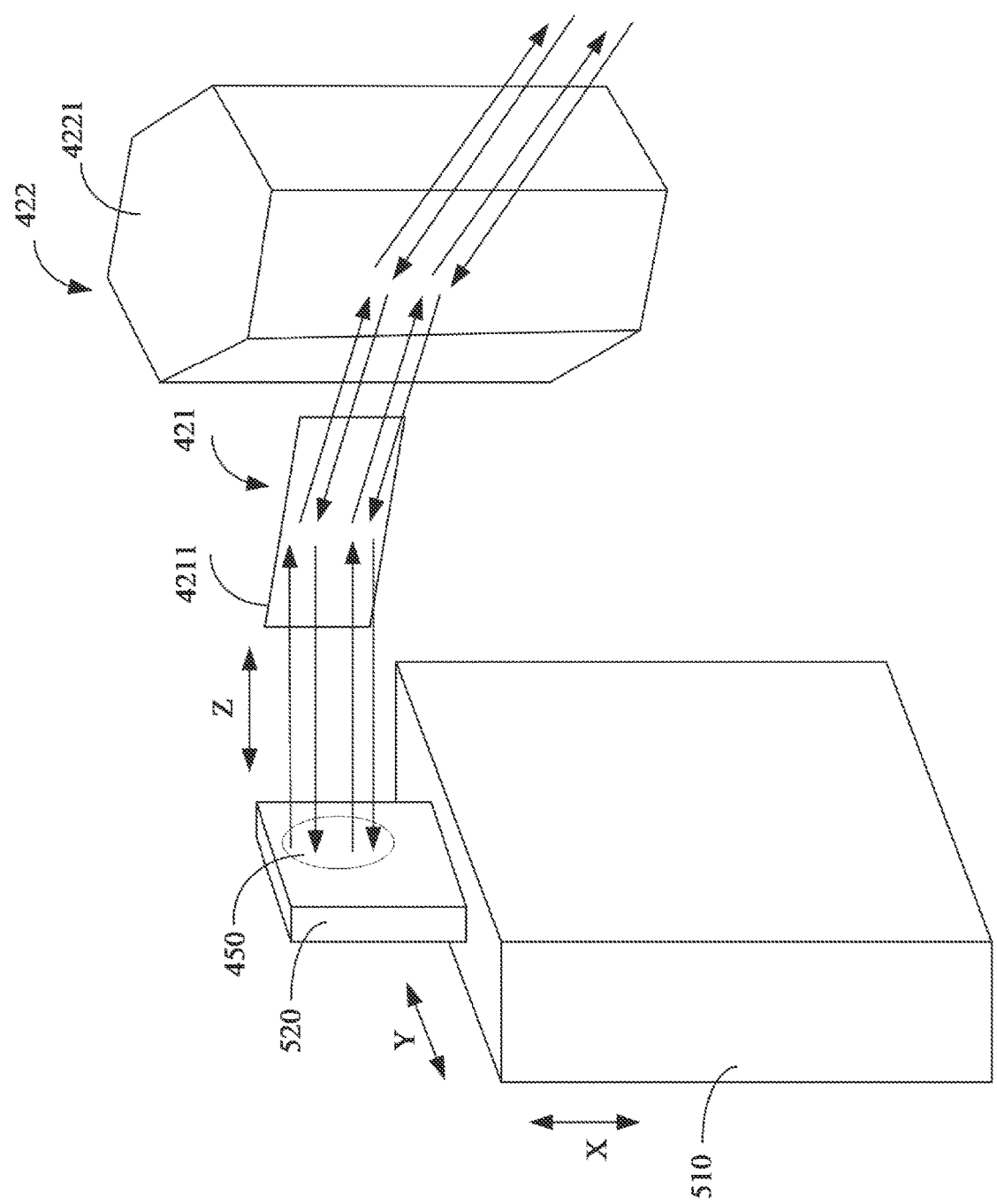
FIG. 4 is a schematic structural diagram of an arrangement of a dimming lens group corresponding to a one-dimensional galvanometer and a one-dimensional rotating mirror according to an embodiment of this application.

As shown in FIG. 4, the frequency modulated continuous wave LiDAR 10 also includes a beam scanning module 420. The beam scanning module 420 is disposed on a side of the refraction module 400 facing the target object. The beam scanning module 420 is configured to receive the detection light passing through the refraction module 400 and emit the detection light to the target object, and is also configured to receive the echo light reflected by the target object and emit the echo light to the refraction module 400. The beam scanning module 420 can be a galvanometer, a rotating mirror, a MEMS micro-galvanometer, or the like, or a combination thereof. As shown in the figure, in some embodiments, the beam scanning module 420 includes a one-dimensional galvanometer 421 and a one-dimensional rotating mirror 422.

The one-dimensional galvanometer 421 has a galvanometer 4211, and the galvanometer reciprocates and rotates in the second direction X. The galvanometer 4211 is configured to reflect echo light from the one-dimensional rotating mirror 422 to the refraction module 400, or reflect detection light from the refraction module 400 to the one-dimensional rotating mirror 422, so that the one-dimensional galvanometer 421 can provide a scanning field of view for the frequency modulated continuous wave LiDAR 10 in the second direction X. For example, the second direction X is the vertical direction.

The one-dimensional rotating mirror 422 has a rotating mirror 4221 and a rotating mirror shaft (not shown in the figure). The rotating mirror shaft extends along the second direction X and is connected to the rotating mirror to drive the rotating mirror 4221 to rotate around the rotating mirror shaft. The rotating mirror 4221 has multiple rotating mirror reflection surfaces to reflect the detection light from the one-dimensional galvanometer 421 to the target object, or reflect the echo light from the target object to the one-dimensional galvanometer 421. During rotation of the one-dimensional rotating mirror 422, an angle between the optical path and the rotating mirror reflection surface continuously changes to achieve scanning. The one-dimensional rotating mirror 422 can provide the frequency modulated continuous wave LiDAR 10 with a scanning field of view in the first direction Y. For example, the first direction Y is the horizontal direction.

When the one-dimensional rotating mirror 422 rotates, a part of displacement caused due to the walk-off effect extends along an arrangement direction (that is, the first direction Y) of the emission waveguide and the receiving waveguide of the transceiving unit 330. Therefore, emission and receiving optical paths of the transceiving unit also need to extend along the direction perpendicular to the terminal surfaces of the emission waveguide and the receiving waveguide (that is, the second direction X). It is difficult for the optical paths of the multiple transceiving units 330 to be staggered in the second direction. It is also difficult to increase the number of equivalent lines in the second direction. At this time, the refraction module 400 changes the light propagation direction and changes the optical path direction of the transceiving unit from the second direction to the first direction Y, so that the optical paths of the multiple channels are staggered in the second direction. After the optical paths of the multiple transceiving units are scanned by the beam scanning module, multiple scanning trajectories staggered in the second direction can be formed in the field of view, thereby increasing the number of equivalent lines.

Each transceiving unit 330 includes an emission module 331 and a coupling module 332. The emission module 331 includes an emission waveguide 3311. The emission waveguide 3311 has an emission terminal surface 331*b*. The coupling module 332 includes at least one receiving waveguide 3321. Each receiving waveguide 3321 has a receiving terminal surface 332*b*. The emission terminal surface 331*b* of the emission module 331 and the receiving terminal surface 332*b* of the coupling module 332 are parallel and form the terminal surface of the transceiving unit 330. The emission module 331 emits the received detection light outward from the emission terminal surface 331*b*; and for the coupling module 332, the receiving terminal surface 332*b* receives the echo light and transmits the echo light to the coupling module 332. The emission waveguide 3311 and the multiple receiving waveguides 3321 may extend in a direction perpendicular to the terminal surface of the transceiving unit 330, or may alternatively extend in a direction forming a specific angle with the terminal surface of the transceiving unit 330.

As shown in FIG. 2 and FIG. 3, the frequency modulated continuous wave LiDAR 10 further includes multiple collimating lens groups 440 that are correspondingly disposed on a front side of the terminal surfaces of the multiple transceiving units 330 and that are configured to collimate the detection light emitted by the transceiving unit 330 and then emit the detection light to the refraction module 400 and also configured to focus the echo light passing through the refraction module 400 and emit the echo light to the transceiving unit 330, to reduce optical loss.

Figure 6:
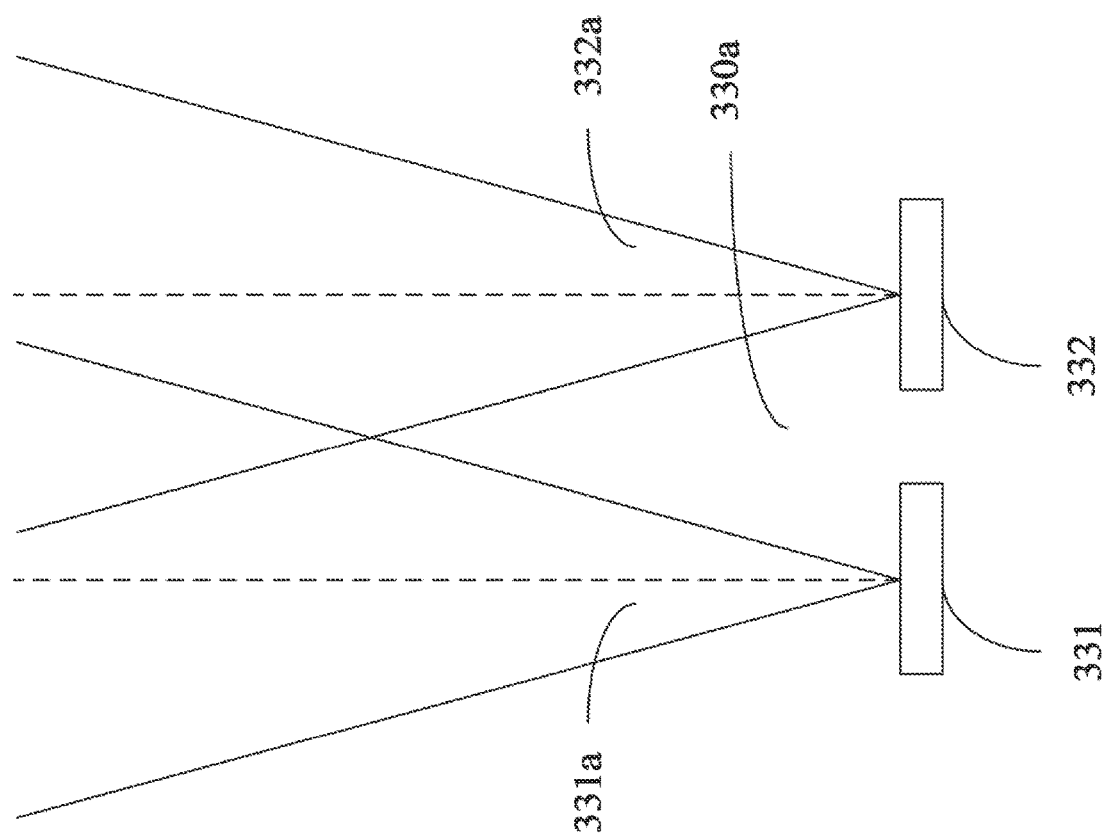
FIG. 6 is a schematic diagram of overlapping of an emission field of view of an emission module and a receiving field of view of a coupling module according to an embodiment of this application.

As shown in FIG. 6, the emission module 331 has an emission field of view 331*a*. A target object within the emission field of view 331*a* can be scanned by the light from the emission module 331, and the target object can also reflect the light. The coupling module 332 has a receiving field of view 332*a*, and light reflected by the target object within the receiving field of view 332*a* can be received by the coupling terminal surface 332*b* of the coupling module 332. The greater the overlapping between the emission field of view 331*a* and the receiving field of view 332*a*, the smaller the scanning blind region 330*a* of the emission module 331 and the coupling module 332. Because there is an interval between the emission module 331 and the coupling module 332, the distance between the emission module 331 and the coupling module 332 is set to be as small as possible to reduce a coverage area of the scanning blind region 330*a*.

The frequency modulated continuous wave LiDAR 10 also includes multiple first amplification modules 430. The multiple first amplification modules 430 are arranged correspondingly to the emission modules 331 of the multiple transceiving units 330, and are configured to amplify the detection light emitted by the corresponding emission module 331, so that amplified detection light has enough energy to be emitted outward to meet a long-distance ranging requirement. The first amplification module 430 may include a first amplification chip, and the first amplification chip may be a semiconductor optical amplifier (SOA) chip. The detection light amplified by the first amplification module 430 is emitted to the collimating lens group 440, and the amplified detection light is collimated by the collimating lens group 440 and then emitted outward.

In some embodiments, the refraction module 400 also includes a dimming lens group 450. The dimming lens group 450 is disposed on the optical path between the refraction module 400 and the beam scanning module 420. The dimming lens group 450 is configured to expand the detection light refracted by the refraction module 400 and then emit the detection light outward, so that a distance between any two beams of detection light emitted through multiple channels is increased and a larger field of view can be covered when the multiple beams of detection light are emitted out through the beam scanning module 420. The dimming lens group 450 is also configured to narrow the echo light and then emit the echo light to the refraction module 400, so that the echo light can pass through the refraction module 400 and the collimating lens group 440 in sequence via a small light transmission area, to match a small-sized refraction module 400 and collimating lens group 440, thereby reducing a volume of the frequency modulated continuous wave LiDAR 10.

The dimming lens group 450 corresponds to multiple groups of transceiving units 330. That is, the multiple transceiving units 330 emit detection light or receive echo light through the same dimming lens group 450. A diameter of the dimming lens group 450 is in centimeters. Compared with the dimming lens group 450, the emission waveguide 3311 and the receiving waveguide 3321 have smaller sizes. For example, the sizes of the emission waveguide 3311 and the receiving waveguide 3321 are usually tens to hundreds of microns. In some embodiments, the emission waveguide 3311 and the receiving waveguide 3321 are disposed adjacent to a main optical axis of the dimming lens group 450. For example, the emission waveguide 3311 and all receiving waveguides 3321 are adjacent to the main optical axis of the dimming lens group 450, so that the dimming lens group 450 adjusts a light propagation direction. For example, the emission waveguide 3311 and all the receiving waveguides 3321 are laid in parallel sequentially along the surface of the silicon photonic chip 300. Terminal surfaces of the emission waveguide 3311 and the receiving waveguide 3321 are flush with a side edge of the silicon photonic chip 300. A main optical axis of the dimming lens group 450 can be disposed between the emission waveguide 3311 and a receiving waveguide 3321 closest to the emission waveguide 3311. The main optical axis of the dimming lens group 450 can also be disposed at the middlemost waveguide or between the two middlemost waveguides. In some embodiments, the dimming lens group 450 includes at least one light-bendable lens. The number of lenses can be specifically selected according to an actual need to meet light focusing and collimation function requirements of the dimming lens group 450.

The receiving module 350 includes a polarization splitter-rotator 351. The polarization splitter-rotator 351 is connected to the receiving waveguide 3321 of the coupling module 332 to receive the echo light transmitted by the coupling module 332, and to convert the echo light into multiple beams of polarized echo light in the same polarization state.

In some embodiments, the coupling module 332 includes M receiving waveguides 3321, where M is an integer greater than or equal to 2. When the coupling module 332 includes M receiving waveguides 3321, the receiving module 350 includes M polarization splitter-rotators 351 that are equal in number to and connected in a one-to-one correspondence with the M receiving waveguides 3321. Each polarization splitter-rotator 351 receives echo light transmitted by a corresponding receiving waveguide 3321 and performs polarization conversion to form multiple beams of polarized echo light. The receiving module 350 also includes an optical frequency mixer 360. One input terminal of the optical frequency mixer 360 is connected to the light splitting module 320 and receives the local oscillator light. Another input terminal of the optical frequency mixer 360 is connected to the polarization splitter-rotator 351, to receive a beam of polarized echo light and perform frequency mixing on the polarized echo light and the local oscillator light to form frequency-mixed light. In some embodiments, the input terminal of the polarization splitter-rotator 351 is connected to the receiving waveguide 3321. The polarization splitter-rotator 351 may include two output terminals. For example, the received echo light is divided into polarized echo light P and polarized echo light S. At this time, the number of optical frequency mixers 360 corresponding to the same polarization splitter-rotator 351 can be two, and the two optical frequency mixers 360 are connected to the two output terminals of the polarization splitter-rotator 351 in a one-to-one correspondence. One optical frequency mixer 360 performs frequency mixing on the polarized echo light P and the local oscillator light, and the other optical frequency mixer 360 performs frequency mixing on the polarized echo light S and the local oscillator light. The polarization splitter-rotator 351 can also perform polarization diversity on the echo light in another manner, output polarization-diversified echo light separately and then perform frequency mixing on the polarization-diversified echo light and the local oscillator light.

The receiving module 350 also includes a first balance detector 370. The first balance detector 370 is connected to the optical frequency mixer 360 to receive the frequency-mixed light for balance detection. In some embodiments, the optical frequency mixer 360 has two output terminals, and the first balance detector 370 is connected to the two output terminals of the optical frequency mixer 360 to receive the frequency-mixed light for processing to form a corresponding coherent electrical signal, and then the coherent electrical signal may be output to another signal processing circuit 700 for further signal processing. For example, a signal processing circuit 700 may be a trans-impedance amplifier (TIA) circuit.

Figure 7:
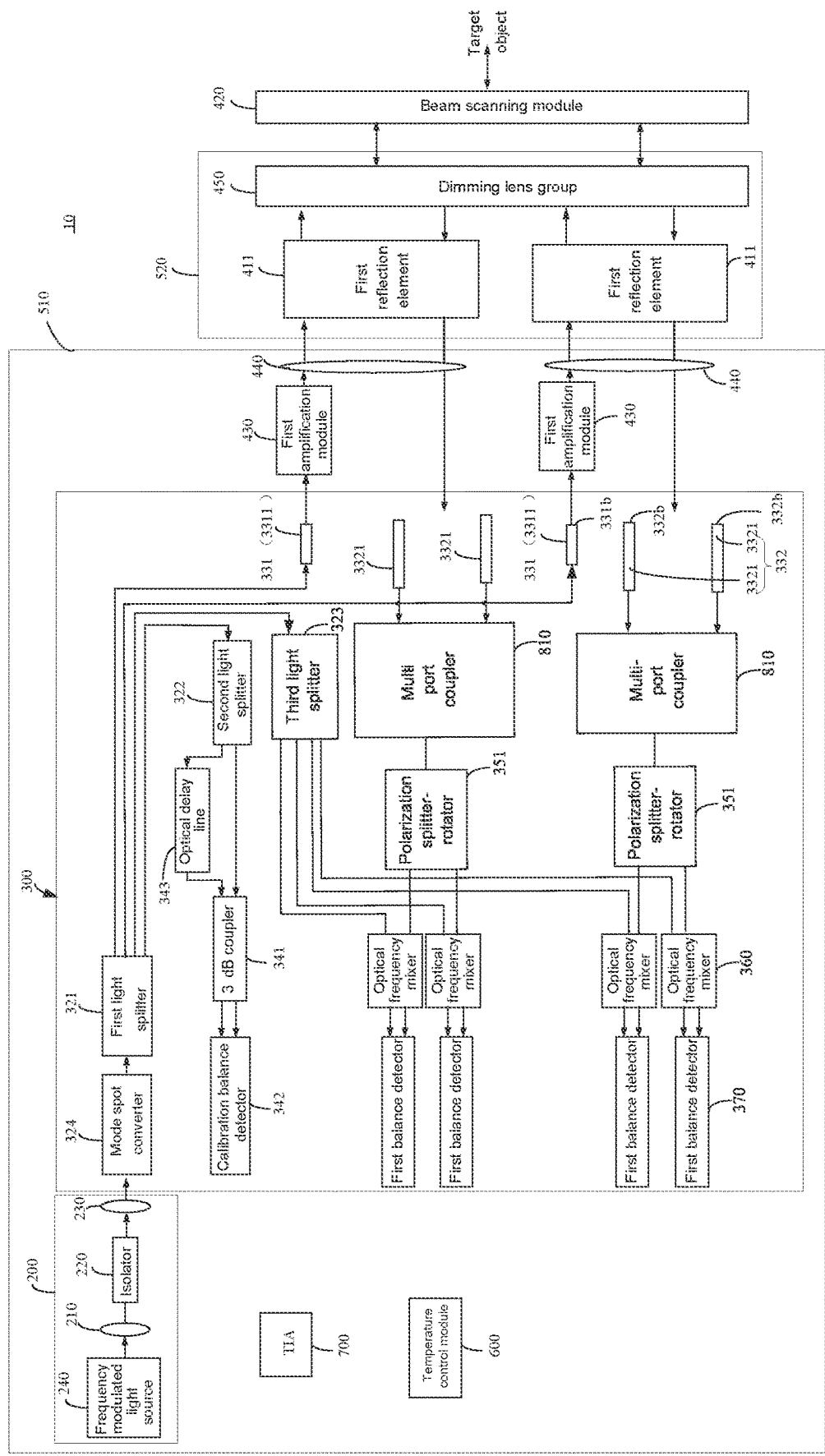
FIG. 7 is a schematic structural diagram of a receiving waveguide connected to a polarization splitter-rotator through a multi-port coupler according to an embodiment of this application.
Figure 8:
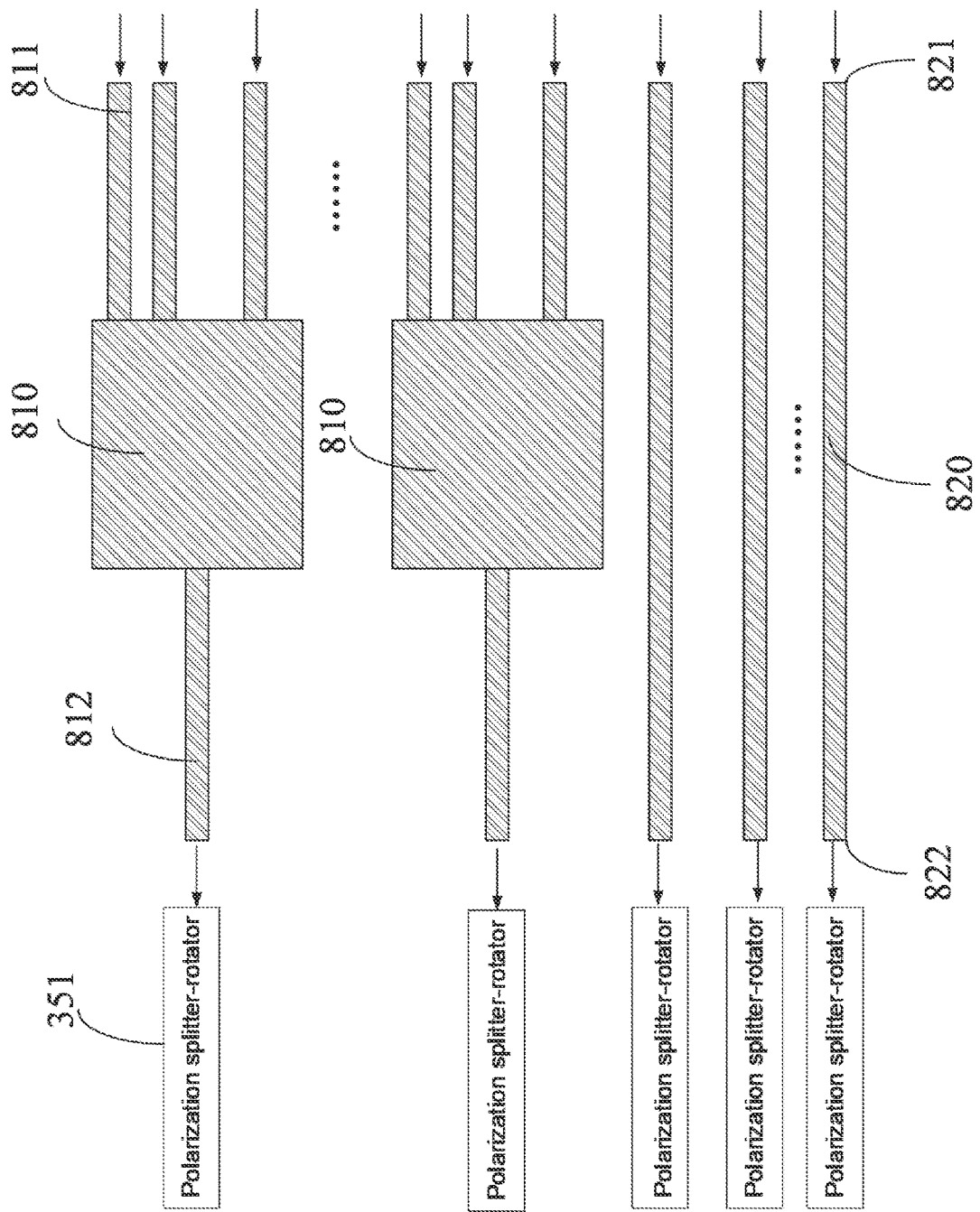
FIG. 8 is a schematic structural diagram of a beam bunching module including multiple multi-port couplers and multiple straight-through waveguides according to an embodiment of this application.

In some embodiments, as shown in FIG. 7, when the coupling module 332 includes M receiving waveguides 3321, the coupling module 332 further includes a beam bunching module, and the beam bunching module includes at least one multi-port coupler 810. As shown in FIG. 8, the multi-port coupler 810 has N first access ports 811 and one first output port 812, where N is an integer greater than or equal to 2. The first output port 812 of the multi-port coupler 810 is connected to the coupling module 332, and at least two first access ports 811 of the multi-port coupler 810 are connected to the multiple receiving waveguides 3321 in a one-to-one correspondence, and therefore, the echo light transmitted by the receiving waveguides 3321 enters the multi-port coupler 810 through the first access port 811, and is integrated by the multi-port coupler 810 and then output through the first output port 812 to the coupling module 332. In some embodiments, the first output port 812 and a polarization splitter-rotator 351 of the coupling module 332 are connected. In this way, in a case that the coupling module 332 includes M receiving waveguides 3321, the multi-port coupler 810 couples the multiple optical signals from the M receiving waveguides 3321 into one optical signal and outputs the optical signal to the corresponding polarization splitter-rotator 351. Only one polarization splitter-rotator 351 needs to be connected to perform polarization conversion on the multiple beams of signal light transmitted by the multiple receiving waveguides 3321, thereby reducing the numbers of optical frequency mixers 360 and first balance detectors 370 and simplifying the entire systematic architecture of the silicon photonic chip 300.

When a large number of receiving waveguides 3321 are connected to the same multi-port coupler 810, the multiple receiving waveguides 3321 and the multi-port coupler 810 are prone to light loss during light transmission. In some embodiments, as shown in FIG. 8, the silicon photonic chip 300 is configured to include multiple multi-port couplers 810, and the multi-port couplers 810 are independently connected to the multiple receiving waveguides 3321 correspondingly, to reduce optical loss when one multi-port coupler 810 is connected to a large number of receiving waveguides 3321.

Compared with a longer distance, when the frequency modulated continuous wave LiDAR 10 and the target object are at a medium or short distance, because optical power of the echo light reflected by the target object is relatively strong, the echo light can meet the detection requirement when passing through the receiving waveguide 3321 and the multi-port coupler 810 to enter the coupling module 332. At this time, the multiple receiving waveguides 3321 of the coupling module 332 can all be configured to be connected to the polarization splitter-rotator 351 through the multi-port coupler 810 to reduce the numbers of hardware such as the optical frequency mixers 360 and the first balance detector 370 subsequently.

When the frequency modulated continuous wave LiDAR 10 and the target object are at a relatively long distance, optical power of the echo light reaching the receiving waveguide 3321 is small, and due to the walk-off effect, the echo light further deviates to some extent. The larger the distance between the frequency modulated continuous wave LiDAR 10 and the target object, the greater the deviation. In some embodiments, as shown in FIG. 8, the beam bunching module is configured to further include at least one straight-through waveguide 820. The straight-through waveguide 820 has a second access port 821 and a second output port 822. The second access port 821 is connected to the receiving waveguide 3321, and the second output port 822 is connected to the coupling module 332, so that the receiving waveguide 3321 transmits an optical signal to the coupling module 332 through the straight-through waveguide 820. The optical signal transmitted through the straight-through waveguide 820 has less loss. In some embodiments, the second output port 822 of each straight-through waveguide 820 is connected to a polarization splitter-rotator 351. For example, when the coupling module 332 includes nine receiving waveguides 3321, energy of the echo light decreases in a direction of leaving the emission waveguide 3311. The beam bunching module is configured to include two multi-port couplers 810 and three straight-through waveguides 820, two multi-port couplers 810 are disposed adjacent to the emission waveguide 3311, one multi-port coupler 810 is connected to the three receiving waveguides 3321 for receiving echo light at the short distance, and another multi-port coupler 810 is connected to the three receiving waveguides 3321 for receiving echo light at the middle distance. The three straight-through waveguides 820 are connected in a one-to-one correspondence with the three receiving waveguides 3321 for receiving echo light at the long distance.

The light splitting module 320 is also configured to split the laser beam coupled into the silicon photonic chip 300 into calibration light. The silicon photonic chip 300 also includes a light source nonlinear calibration optical path 340. The light source nonlinear calibration optical path 340 is connected to the light splitting module 320 and receives the calibration light, to calibrate the laser beam emitted by the frequency modulated light source 240. The light source nonlinear calibration optical path 340 includes a coupler 341 and a calibration balance detector 342. The light splitting module 320 splits out two beams of calibration light. The two beams of calibration light have different delays. In some embodiments, one beam of calibration light enters the coupler 341, and the other beam of calibration light enters the coupler 341 after passing through an optical delay line 343. The calibration light can be delayed after passing through the optical delay line 343. The coupler 341 is configured to perform frequency mixing on the two beams of calibration light with different delays. The calibration balance detector 342 is configured to receive frequency-mixed light output by the coupler 341 and perform balance detection. The coupler 341 is a 3 dB coupler 341. Certainly, other couplers 341 that can achieve the foregoing functions can also be used. During use, an output signal of the calibration balance detector 342 can be further processed to serve as a basis for calibrating the frequency modulated light source 240. By using the frequency modulated continuous wave LiDAR 10 provided in this embodiment, the frequency modulated light source 240 can be calibrated in real time, so that an operator can find and resolve a problem in a timely manner, thereby ensuring accuracy of a detection result.

In some embodiments, the light splitting module 320 includes a mode spot converter 324, a first light splitter 321, a second light splitter 322 and a third light splitter 323. The mode spot converter 324 receives the laser beam emitted by the light source module 200. The first light splitter 321 is connected to the mode spot converter 324 to receive the laser beam emitted by the light source module 200. The first light splitter 321 is also connected to the emission module 331, the second light splitter 322 and the third light splitter 323 separately, and the first light splitter 321 splits the laser beam emitted by the light source module 200 into detection light to be transmitted to the emission module 331, splits the laser beam into the first light to be transmitted to the second light splitter 322, and then splits the laser beam into the third light to be transmitted to the third light splitter 323. The second light splitter 322 is connected to the light source nonlinear calibration optical path 340, splits the first light into two beams of calibration light and transmits the two beams of calibration light to the light source nonlinear calibration optical path 340. The third light splitter 323 is connected to multiple optical frequency mixers 360, splits the third light into multiple beams of local oscillator light, and transmits the multiple beams of local oscillator light to the multiple optical frequency mixers 360 in a one-to-one correspondence. Certainly, a disposition method for the light splitting module 320 in the embodiments of this application includes but is not limited to the foregoing disposition method, and can be specifically selected according to an actual need.

In some embodiments, the mode spot converter 324 includes a first waveguide, where the first waveguide is a cone-shaped waveguide, a cantilever waveguide or a multilayer waveguide. The first waveguide and the emission waveguide 3311 can be made of the same material. At this time, beams that can be transmitted by the first waveguide and the emission waveguide 3311 have equal optical power, and the first waveguide and the emission waveguide 3311 can be disposed in the same layer, and the first waveguide communicates with the emission waveguide 3311 directly through the first light splitter 321 to transmit light, thereby simplifying the structure of the silicon photonic chip 300. The emission waveguide 3311 and the receiving waveguide 3321 can be made of the same material, to simplify a manufacturing process of the emission waveguide 3311 and the receiving waveguide 3321.

When the optical power allowed in the first waveguide is equal to the optical power allowed in the receiving waveguide 3321, it indicates that the power of the detection light that can be transmitted by the silicon photonic chip 300 is limited, and the detection light emitted by the emission waveguide 3311 has limited energy, making it difficult to meet an emission energy requirement for long-distance ranging. In some embodiments, the frequency modulated continuous wave LiDAR 10 is configured to include a first amplification module 430.

In some other embodiments, when optical power of the laser beam entering the first waveguide of the mode spot converter 324 is relatively large, correspondingly, it is necessary to select a first waveguide made of a material allowing larger optical power. In this case, the materials of the first waveguide and the emission waveguide 3311 can be set to be different, the optical power allowable in the first waveguide is greater than the optical power allowable in the emission waveguide 3311, and the silicon photonic chip 300 is configured to also include an interlayer mode converter (not shown in the figure). The laser beam emitted by the first waveguide is subjected to interlayer conversion through evanescent wave coupling in the interlayer mode converter and transmitted to the emission waveguide 3311.

When the first waveguide and the receiving waveguide 3321 are of the same material, the first waveguide and the receiving waveguide 3321 can both be made of a silicon material to simplify a manufacturing process of the first waveguide and the receiving waveguide 3321. When the optical power allowed in the first waveguide is greater than the optical power allowed in the receiving waveguide 3321, the first waveguide can be made of a silicon nitride material, and the receiving waveguide 3321 can be made of the silicon material.

The frequency modulated continuous wave LiDAR 10 also includes a first packaging housing 510 and a second packaging housing 520. The light source module 200, the silicon photonic chip 300 and the first amplification module 430 are all disposed in the internal space of the first packaging housing 510. In some embodiments, as shown in the figure, the refraction module 400, the beam scanning module 420 and the dimming lens group 450 are configured to be mounted in the internal space of the second packaging housing 520. The collimating lens group 440 may be mounted in the internal space of the first packaging housing 510, or the collimating lens group 440 may be mounted in the internal space of the second packaging housing 520. The first packaging housing 510 and the second packaging housing 520 respectively have a first channel for the detection light to pass through, and also have a second channel for the echo light to pass through. The light source module 200 also includes a light source housing. The first light guide mirror 210, the isolator 220, the second light guide mirror 230 and the frequency modulated light source 240 can all be packaged in the light source housing to form integrity, and then packaged in the first packaging housing 510.

The frequency modulated continuous wave LiDAR 10 also includes a temperature control module 600. The temperature control module 600 can also be packaged in the internal space of the first packaging housing 510. The temperature control module 600 is configured to monitor a temperature change inside the first packaging housing 510, to observe working statuses of optical devices such as the light source module 200 and the silicon photonic chip 300 inside the first packaging housing 510.

An embodiment of this application further provides an autonomous driving device, where the autonomous driving device includes one of a vehicle, an aircraft, or one or more related devices that use the LiDAR for smart sensing and detection. The automatic driving device includes an automatic driving body and the foregoing frequency modulated continuous wave LiDAR 10. The frequency modulated continuous wave LiDAR 10 is mounted on the autonomous driving body. For example, when the autonomous driving device is a vehicle, the autonomous driving body includes a roof of the vehicle, and the frequency modulated continuous wave LiDAR 10 is mounted on the roof of the vehicle.

The same or similar reference signs in the drawings of the embodiments correspond to the same or similar components. In descriptions of this application, it should be understood that azimuth or position relationships indicated by terms such as "above", "under", "left", and "right" are based on the azimuth or position relationships shown in the accompanying drawings, are merely intended to describe this application and simplify the descriptions, but are not intended to indicate or imply that the specified device or element shall have specific azimuth or be formed and operated in specific azimuth, and therefore, the terms for describing the position relationships in the drawings are only used for exemplary illustration, and should not be construed as a limitation on this patent. A person of ordinary skill in the art can understand specific meanings of the foregoing terms based on a specific situation.

The foregoing descriptions are only preferred embodiments of this application, and are not intended to limit this application. Any modification, equivalent replacement and improvement made within the spirit and principle of this application shall be included within the protection scope of this application.

What is claimed is:

1. A frequency modulated continuous wave LiDAR, comprising:
   a light source module, configured to emit a frequency modulated continuous wave laser beam;
   a silicon photonic chip, comprising a light splitting module, a receiving module and multiple transceiving units, wherein terminal surfaces of the multiple transceiving units are arranged along a first direction, wherein the light splitting module receives a laser beam coupled into the silicon photonic chip, divides the laser beam into multiple beams of detection light, and transmits the multiple beams of the detection light to corresponding multiple transceiving units, and wherein the corresponding multiple transceiving units emit the received detection light outward, and also transmit received echo light to the receiving module to form a detection channel, wherein each transceiving unit comprises an emission module and a coupling module, the emission module emits the received detection light outward from an emission terminal surface, the coupling module receives the echo light via a receiving terminal surface and transmits the echo light to the receiving module, the emission module comprises an emission waveguide, the coupling module comprises at least one receiving waveguide, the emission waveguide and the at least one receiving waveguide are laid in parallel sequentially along the surface of the silicon photonic chip;
   a refraction module, configured to refract the detection light emitted by the multiple transceiving units to emit the multiple beams of the detection light in a staggered manner in a second direction, and configured to refract multiple beams of the echo light staggered in the second direction and then to emit the multiple beams of the echo light to the corresponding transceiving units, wherein the second direction is a direction perpendicular to at least one of the terminal surfaces of the transceiving units; and
   a beam scanning module, comprising a one-dimensional galvanometer and a one-dimensional rotating mirror, wherein the one-dimensional galvanometer is configured to reflect detection light from the refraction module to the one-dimensional rotating mirror, one-dimensional rotating mirror is configured to reflect the detection light from the one-dimensional galvanometer to the target object, the one-dimensional galvanometer is configured to provide a scanning field of view in the second direction, the one-dimensional rotating mirror is configured to provide a scanning field of view in the first direction.

2. The frequency modulated continuous wave LiDAR according to claim 1, wherein the refraction module comprises at least one of a first reflection element and a first refraction prism; and wherein a number of the first reflection elements is at least one, and a number of the first refraction prisms is at least one.

3. The frequency modulated continuous wave LiDAR according to claim 2, wherein the refraction module comprises multiple first reflection elements disposed corresponding to the multiple transceiving units;
wherein each first reflection element is configured to reflect optical paths of the detection light emitted by a corresponding transceiving unit and the received echo light;
wherein each first reflection element and a terminal surface of the corresponding transceiving unit are disposed at intervals in the second direction; and
wherein the multiple first reflection elements are staggered in the second direction.

4. The frequency modulated continuous wave LiDAR according to claim 2, wherein the refraction module comprises multiple first refraction prisms;
wherein the multiple beams of detection light emitted by the multiple transceiving units are emitted to corresponding multiple first refraction prisms, and are refracted by the multiple first refraction prisms and emitted outward in the staggered manner in the second direction; and
wherein after the multiple beams of the echo light staggered in the second direction are refracted by the corresponding first refraction prisms, each beam of echo light returns to a corresponding transceiving unit through a corresponding detection channel.

5. The frequency modulated continuous wave LiDAR according to claim 1, wherein the frequency modulated continuous wave LiDAR further comprises multiple collimating lens groups;
wherein the multiple collimating lens groups are correspondingly disposed on a front side of the terminal surfaces of the multiple transceiving units; and
wherein the multiple collimating lens groups are configured to collimate the detection light emitted by the multiple transceiving units and are also configured to focus the echo light emitted to the multiple transceiving units.

6. The frequency modulated continuous wave LiDAR according to claim 1,
wherein the emission terminal surface of the emission module and the receiving terminal surface of the coupling module form the terminal surface of the transceiving unit.

7. The frequency modulated continuous wave LiDAR according to claim 6, wherein the frequency modulated continuous wave LiDAR further comprises multiple first amplification modules, disposed corresponding to the emission module and configured to amplify the detection light emitted by the emission module.

8. The frequency modulated continuous wave LiDAR according to claim 1, wherein the refraction module further comprises:
a dimming lens group, configured to perform beam expansion on the detection light refracted by the refraction module and then emit the detection light outward, and also configured to perform beam reduction on the echo light and then emit the echo light to the refraction module.

9. The frequency modulated continuous wave LiDAR according to claim 8, wherein the multiple transceiving units emit the detection light or receive the echo light through the same dimming lens group.

10. The frequency modulated continuous wave LiDAR according to claim 1, wherein the frequency modulated continuous wave LiDAR further comprises:
a first packaging housing, wherein the light source module and the silicon photonic chip are packaged in internal space of the first packaging housing; and
a second packaging housing, wherein the refraction module is packaged in internal space of the second packaging housing;
wherein the second packaging housing is docked with the first packaging housing;
wherein the first packaging housing is provided with multiple first optical through holes;
wherein the second packaging housing is provided with multiple second optical through holes; and
wherein the multiple first optical through holes and the multiple second optical through holes are disposed correspondingly to allow the detection light and the echo light to pass through.

11. An autonomous driving device, comprising:
the frequency modulated continuous wave LiDAR according to claim 1; and
an autonomous driving body, wherein the frequency modulated continuous wave LiDAR is mounted on the autonomous driving body by using a horizontal direction as the first direction and a vertical direction as the second direction.

* * * * *